United States Patent [19]

Vinot

[11] 4,163,288

[45] Jul. 31, 1979

[54] ASSOCIATIVE MEMORY

[75] Inventor: Daniel Vinot, Sucy-en-Brie, France

[73] Assignee: Compagnie Internationale pour l'Informatique Cii-Honeywell Bull (Societe Anonyme), Paris, France

[21] Appl. No.: 785,233

[22] Filed: Apr. 6, 1977

[30] Foreign Application Priority Data

Apr. 15, 1976 [FR] France .................. 76 11234

[51] Int. Cl.$^2$ .......................... G06F 7/04; G11C 15/00
[52] U.S. Cl. .................................. 364/900; 365/49
[58] Field of Search ... 364/200 MS File, 900 MS File; 340/173 AM; 365/49, 50

[56] References Cited

U.S. PATENT DOCUMENTS

| | | | |
|---|---|---|---|
| 3,581,291 | 5/1971 | Iwamoto et al. | 364/200 |
| 3,588,839 | 6/1971 | Belady et al. | 364/200 |
| 3,602,899 | 8/1971 | Lindquist et al. | 364/200 |
| 3,693,165 | 9/1972 | Reiley et al. | 364/200 |
| 3,781,808 | 12/1973 | Ahearn et al. | 364/200 |
| 3,958,225 | 5/1976 | Turner et al. | 364/900 |
| 3,967,247 | 6/1976 | Andersen et al. | 364/200 |
| 3,979,726 | 9/1976 | Lange et al. | 364/200 |

*Primary Examiner*—Gareth D. Shaw
*Assistant Examiner*—Thomas M. Heckler
*Attorney, Agent, or Firm*—Cameron, Kerkam, Sutton, Stowell & Stowell

[57] ABSTRACT

A high capacity associative read/write memory is provided which includes storage means which can be read from or written into and having memory units of equal capacity each containing an equal and predetermined number of levels. Addressing means are coupled to the memory for addressing the data locations in the memory. A first comparator compares the content of the memory addressed (the data descriptor word) with the words read from the associative memory and a second comparator compares the content of the words read from the associative memory with the content of a descriptor containing the memory word to be invalidated. The number of comparators is equal to twice the number of memory levels multiplied by the number of memory units and is independent of the capacity of the memory. The outputs of the comparators are multiplexed to enable it to be used in the normal mode or in an associative mode.

2 Claims, 2 Drawing Figures

ASSOCIATIVE MEMORY

BACKGROUND OF THE INVENTION

Field of the Invention

The present invention relates to an assembly for associative memories and to a high-performance circuit intended for multiprocessor systems having two hierarchically arranged memory levels.

A related associative memory is disclosed in a copending application Ser. No. 785,234, filed Apr. 6, 1977, by Daniel Vinot, now U.S. Pat. No. 4,128,899 the entire disclosure of which is hereby incorporated by reference.

The use of associative memories as memory masks with multiprocessors creates problems from the point of view of the software which, in order to ensure the validity of the information contained in the memories, has constantly to update a validity bit associated with each addressed location in a circuit external to the memories. The problem is all the more complicated because of the numerous write operations which are performed in the auxiliary memory and which may be initiated by any processor. The management involved, which is the responsibility of the software, takes time.

During a write operation, each address is transmitted simultaneously to all the masks of the system and a search is made. If the search is successful, the corresponding location is indicated as requiring invalidation. The frequency of the invalidating operations increases with the number of processors. If a normal search operation and an invalidating operation cannot be performed simultaneously, priority is given to the invalidating function and this inevitably reduces the performance of the computer. This problem exists in particular in cases where a plurality of processors share the same auxiliary memory via a plurality of masks. If a processor performs a write operation at location Y in the auxiliary memory and if mask O has a copy of this location Y, this copy becomes out of date and thus incorrect and needs to be invalidated. The arrangement which is the subject of the present invention allows simultaneous and independent searches for a local user and for a possible invalidation. It prevents any interference between normal running and the invalidation function as used in the specification, the term "normal" is not an invalidation mode and is used to distinguish between an invalidation mode and a normal processing running mode.

SUMMARY OF THE INVENTION

The circuit which is the subject of the invention is characterised by the fact that it comprises two association assemblies for a single read/write memory assembly a first assembly comparing the content of the data descriptor word with the words read from the first associative memory assembly and a second assembly comparing the content of the words read from the associative memory to a data descriptor word corresponding to the memory word to be invalidated.

BRIEF DESCRIPTION OF THE DRAWINGS

The invention will be better understood from the following description, which is given with reference to the drawings; in which.

DESCRIPTION OF THE PREFERRED EMBODIMENTS

Figure 1:
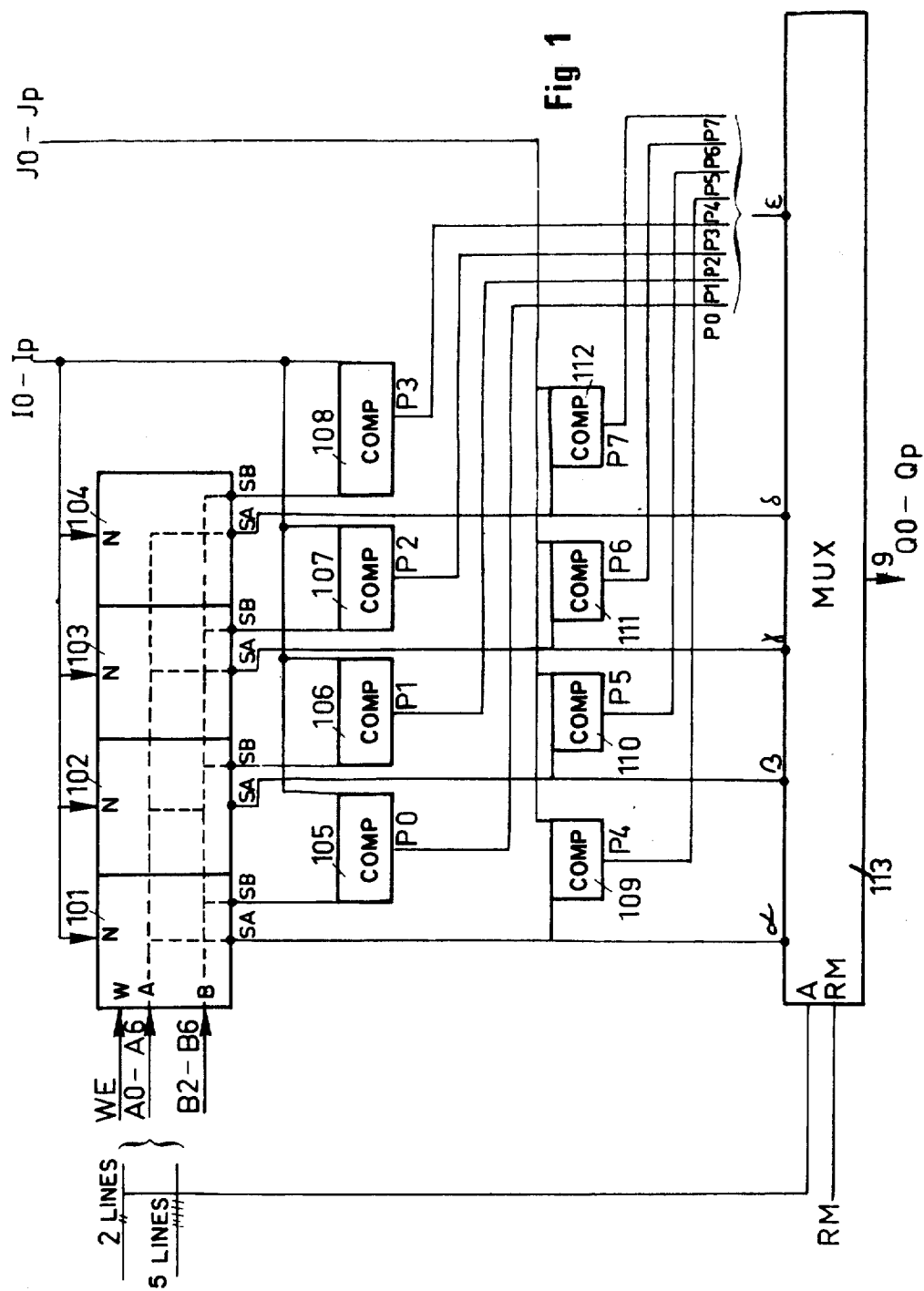
FIG. 1 is a general diagram of a double associative memory assembly according to the invention.

The associative memory shown in FIG. 1 contains four memory levels, each level consisting of memory elements of equal capacity which are identified by the numbers 101 to 104, corresponding to the order of the levels from 0 to 3. In the invalidation mode, all the memory levels are addressed by the address word which has to be invalidated whereas in a normal mode, only one memory level is addressed by the address of the word which has to be written or read in said memory level. The address of the word to be invalidated is represented in the Figure by the letters A2 to A6 and this address is applied to point A. The address of the normal word is represented by letters B2 to B6 and is applied to point B. Data description words are placed on lines I0 to IP and J0 to JP. The address A0 to A6 comprises a first bit zone A0 and A1 representing the selection of one of the four memory levels, and a zone extending from A2 to A6 representing an address within a level. The address B2 to B6 is applied simultaneously to all the levels. The selection of the read or write mode is performed by means of the line WE which is connected to point W. The items of data I0 to IP to be written in the normal mode are applied to points N on each level. SA and SB are the outlet points for the memory words from each level when they are addressed by address words A2 to A6 and B2 to B6 respectively. In the normal search mode, to check that a word is already contained in store, a search is made by means of the address word B2 to B6, which addresses all the levels simultaneously, and the words read from each level appear at outputs SB and are compared with the data descriptor I0 to IP by means of four comparators 105 to 108 whose outputs are indicated by the letters P0 to P3. When the content of one of the levels is the same, one of the outputs P0 to P3 goes to the binary 1 state. For invalidation, the search is made by means of address A2 to A6, which addresses all the levels simultaneously, and the words read from each level appear at outputs SA and are compared with the data word J0 to Jp to be invalidated by mèans of four comparators 109 to 112, whose outputs are indicated by the letters P4 to P7. When the content of one of the levels is the same, one of the binary outputs P4 to P7 goes to the 1 state and this signal is used in an external circuit to control the invalidating operation.

The outputs SA from each level of the memory as well as the outputs of the comparators are multiplexed by means of a multiplexer 113, which is controlled by a signal RM applied to a multiplexer control signal input. When RM=1, the multiplexer inputs $\alpha$, $\beta$, $\gamma$ and $\delta$ are selected. When RM=0, only input $\epsilon$ is selected.

Connected to input A are two control conductors which transmit the bits A0 and A1 of the address word which select a memory level. The multiplexed inputs are indicated by $\alpha$, $\beta$, $\gamma$, $\delta$, $\epsilon$. Input $\alpha$ is connected to output SA of level 0 101, input $\beta$ is connected to output SA of level 1 102, input $\gamma$ is connected to output SA of level 2 103, input $\delta$ is connected to output SA of level 3 104, and input $\epsilon$ is connected to outputs P0 to P7 of comparators 105 to 112. Thus, inputs $\alpha$, $\beta$, $\gamma$ and $\delta$ collectively may be considered a first multiplexer data input, and input $\epsilon$ receiving the comparator outputs P0-P7 may be considered a second multiplexer data input. As is described in greater detail below with particular reference to FIG. 2, the actual coupling of the comparator outputs P0–P7 to the input $\epsilon$ is via at least one AND circuit, representative AND circuits being denoted 214 and 216 in FIG. 2.

In the invalidation mode, RM=1 and only inputs $\alpha$, $\beta$, $\gamma$, $\delta$ are selected by the address bits A0 and A1.

$$A0^* \cap A1^* \rightarrow \alpha$$

$$A0^* \cap A1 \rightarrow \beta$$

$$A0 \cap A1^* \rightarrow \gamma$$

$$A0 \cap A1 \rightarrow \delta$$

In the simultaneous search mode, RM assumes the 0 state and input $\epsilon$ is selected.

The output of the multiplexer is indicated by 9 and transmits a word which is marked Q0 to QP.

An address conflict may exist when there is an invalidating order and an operating order to the same level and to the same address. The conflict will be reported by the combined outputs P0 to P7 of the comparators. A conflict on level 0 will be indicated by P0=1 and P4=1. A conflict on level 1 will be indicated by P1=1 and P5=1. On level 3 the conflict will be indicated by P3=1 and P7=1 and so on. Once a conflict has been reported, it will be possible by means of a circuit external to the double associative memory of the invention to give priority to the invalidating order.

Figure 2:
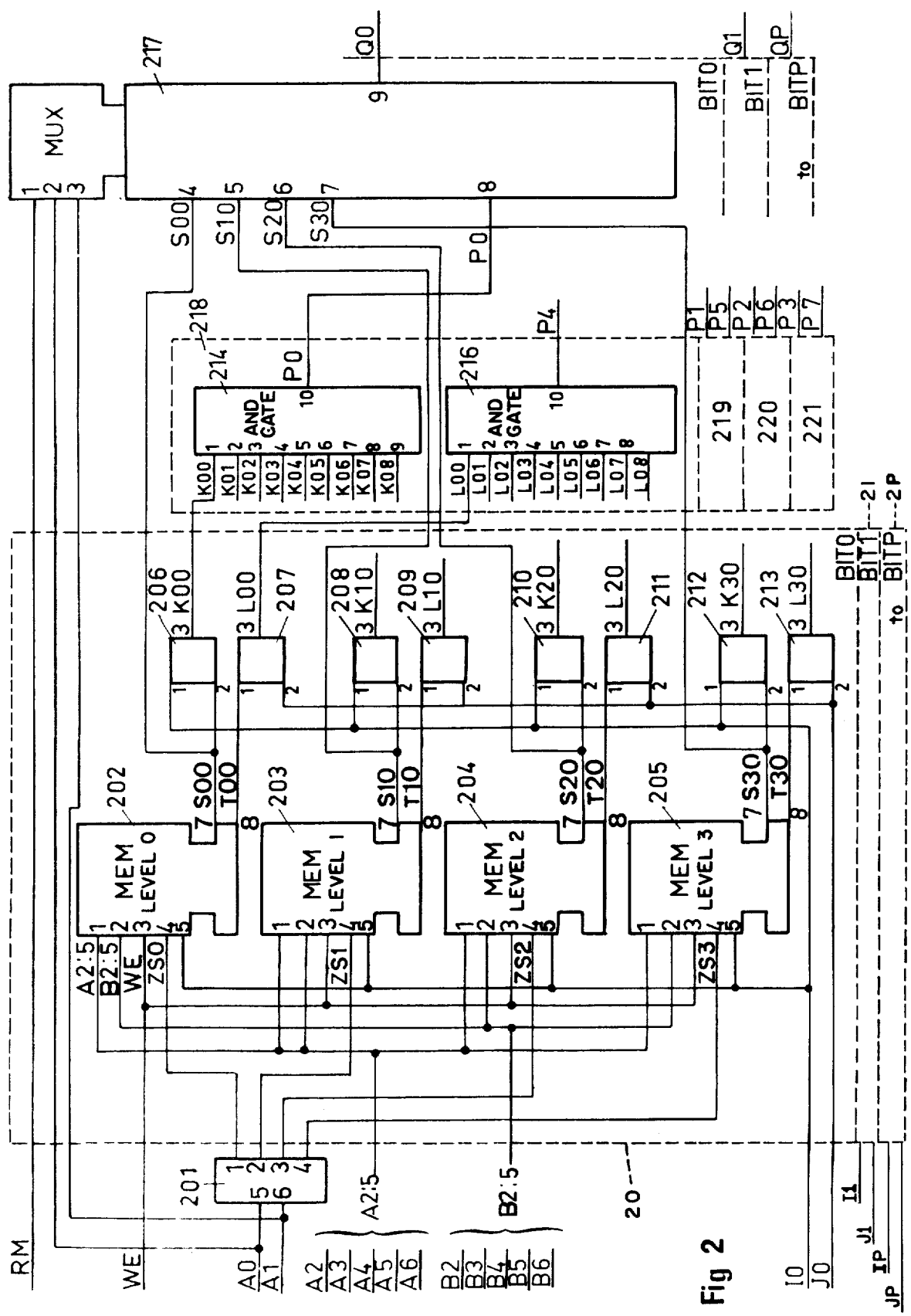
FIG. 2 is a detailed diagram of an embodiment of the double associative memory.

FIG. 2 shows in detail an embodiment of a memory. It is made up of identical memory units numbered from 20 to 2P although only unit 20 is shown in detail.

Unit 20 consists of memory means 202 to 205 corresponding respectively to levels 0, 1, 2 and 3 of the memory.

A memory mean is selected by means of outputs 1, 2, 3 and 4 of a decoder 201, which are connected respectively to the terminals 4 of memory means 202, 203, 204 and 205 and which emit signals ZS0, ZS1, ZS2 and ZS3 as dictated by the states which appear at the inputs 5 and 6 of the decoder. The inputs 5 and 6 of decoder 201 are connected to the inputs A0 and A1 of the associative memory which receive the two bits (A0, A1) for addressing the memory levels in which the information has to be invalidated. The inputs 1 of each memory means are connected to the five input terminals A2 to A6 of the associative memory which receive the address bits for the information to be invalidated within each level. The inputs 2 of each memory means are connected to the five input terminals B2 to B6 of the double associative memory which receive the address bits for normal information. The inputs 3 of each memory means are controlled by the write authorisation signal WE. The inputs 5 of each memory means are connected together and receive bit I0 of the normal data descriptor. The inputs 1 of the comparators 206, 208, 210 and 212 are connected together and receive bit I0 of the normal data descriptor. The inputs 2 of the same comparators are connected to outputs S00, S10, S20 and S30 of memory means 202 to 205. These comparators emit from their outputs 3 signals K00, K10, K20 and K30, which thus represent a comparison on each level between bit 0 of the memory word and bit I0 of the data descriptor.

The inputs 1 of comparators 207, 209, 211 and 212 are connected respectively to outputs T00, T10, T20 and T30 of memory elements 202 to 205.

The inputs 2 of the same comparators are connected together and receive bit J0 of the descriptor for the word to be invalidated. These comparators emit from their outputs 3 signals L00, L10, L20 and L30, which thus represent a comparison on each level between bit 0 of the memory word and bit J0 of the descriptor for the data to be invalidated.

An AND circuit 214 receives at its inputs the signals K00, K01, ... K08, and its output 10 emits the signal P0 when the content of the memory word on level 0 is identical with the content of the normal data descriptor. The signals K01 to K08 are emitted by comparators identical to comparator 206 which are situated in memory units 21 to 2P respectively. AND circuits whose operation is identical to that of AND circuit 214 are provided in the units 219, 220 and 221 shown in broken lines and emit signals P1, P2, and P3, the equations for which are:

$$P1 = \cap K1i$$

$$i = 0, 1 \ldots 8$$

$$P2 = \cap K2i$$

$$i = 0 \ldots 8$$

$$P3 = \cap K3i$$

$$i = 0 \ldots 8$$

AND circuit 216 receives at its inputs signals L00, L01 ... L08 and its output 10 emits signal P4 when the content of the memory word on level 0 is identical with the content of the descriptor for the data to be invalidated. The signals L01 to L08 are emitted by comparators identical to comparators 207 which are situated in memory units 21 to 28 respectively. AND circuits whose operation is identical to that of AND circuit 216 are provided in the units 219, 220 and 221 shown in broken lines and emit signals P5, P6 and P7 in accordance with the equations:

$$P5 = \cap L1i$$

$$i = 0 \ldots 8$$

$$P6 = \cap L2i$$

$$i = 0 \ldots 8$$

$$P7 = \cap L3i$$

$$i = 0 \ldots 8$$

The signal P0 from the output of AND gate 214 is applied to input 8 of multiplexer 217. It is transmitted to the Q0 output of the multiplexer when signal RM=0 is applied to input 1 of the multiplexer. When signal RM=1, the selection at the multiplexer is performed by the two address bits A0 and A1 which are applied to inputs 2 and 3 of the multiplexer.

When $A0^* \cap A1^* = 1$, the signal S00 at output 7 of element 202 which is transmitted to input 4 of the multiplexer is selected and appears at its Q0 output 9.

When $A0^* \cap A1 = 1$ the signal S10 applied to input 5 of the multiplexer is transmitted from its Q0 output.

When $A0 \cap A1^* = 1$, the signal S20 applied to input 6 of the multiplexer is transmitted from its Q0 output.

When $A0 \cap A1 = 1$, the signal S30 applied to input 7 of the multiplexer is transmitted from its Q0 output.

There are as many multiplexers as there are memory units. The succeeding multiplexers emit signals QI to QP.

From the preceding description it will be apparent that the number of comparators required to recognise the normal data descriptor is equal to the number of memory levels multiplied by the number of memory units. This number is the same for the comparators for recognising the word to be invalidated. To product the present associative memory, it is therefore necessary to have a number of comparators equal to twice the number of levels multiplied by the number of memory units and the number of comparators independent of the overall capacity of the memory.

The example which has been described is merely one possible embodiment of the invention and it is clear that a man skilled in the art would be capable of applying various modification without thereby exceeding the scope of the invention.

I claim:

1. An associative memory comprising:

memory means for storing a plurality of data;

first and second addressing means coupled to the memory means to address data locations in the memory means;

first comparator means having a first input, a second input, and an output;

means for applying data to the second input of the first comparator means;

means for coupling the first input of the first comparator means to the memory means to enable the comparison of the data content of the memory location addressed by the first addressing means with data applied to the second input of the first comparator means;

second comparator means having a first input, a second input, and an output;

means for applying data to the second input of the second comparator means;

means for coupling the first input of the second comparator means to the memory means to enable the comparison of the data content of the memory location addressed by the second addressing means with data applied to the second input of the second comparator means;

a multiplexer having first and second data inputs, a data output, and a control signal input, said multiplexer serving to transmit data from either the first data input or the second data input to the data output as determined by the control signal input;

means for coupling said multiplexer first data input to the memory means to receive the data content of the memory location addressed by one of the addressing means; and means including an AND circuit for coupling said multiplexer second data input to the outputs of said comparators to receive data indicating whether there is an address conflict.

2. The associative memory according to claim 1 in which said memory means includes a plurality of memory units and in which the number of first and second comparator means is equal to twice the number of memory units.

* * * * *